3,081,317
PROCESS FOR PREPARING 1,4-ANDROSTADIENE-
2,17β-DIOL-3-ONE
Robert L. Clarke, Bethlehem, N.Y., assignor to Sterling
Drug Inc., New York, N.Y., a corporation of Delaware
No Drawing. Filed Mar. 16, 1959, Ser. No. 799,459
6 Claims. (Cl. 260—397.4)

This invention relates to a novel steroid compound, 1,4-androstadiene-2,17β-diol-3-one, to ethers and esters thereof, and to a process for the preparation thereof.

The compounds of the invention are of the following general formula

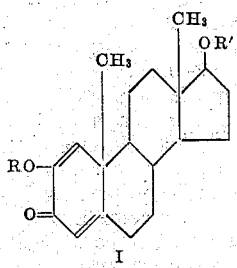

I wherein R represents hydrogen or a lower-alkyl or carboxylic acyl radical, and R' represents hydrogen or a carboxylic acyl radical.

In the above general Formula I when R represents a lower-alkyl radical it stands for a lower-alkyl radical having from one to about four carbon atoms, thus including such radicals as methyl, ethyl, propyl, isopropyl, butyl, secondary-butyl, isobutyl, and the like.

In the above general Formula I when R and/or R' represent carboxylic acyl radicals, they stand for acyl radicals derived from carboxylic acids having from one to about ten carbon atoms, conventionally employed in the steroid art, and having a molecular weight less than about 250. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

According to the process of my invention, 1,4-androstadiene-2,17β-diol-3-one is prepared by treating 4-androstene-2β,17β-diol-3-one or a mono- or dicarboxylic ester thereof with oxygen under aqueous alkaline conditions. A water-miscible, organic solvent, for example, a lower-alkanol, is preferably present in the reaction mixture to cause at least partial solution of the steroid. If the starting material is esterified, the ester groups are hydrolyzed during the reaction. The reaction takes place readily at room temperature.

The compounds of Formula I wherein R and/or R' represent carboxylic acyl radicals are prepared by conventional esterification reactions, for example, by reacting the free steroid alcohol with the appropriate acid anhydride or acid halide in the presence of an organic base such as pyridine. Half esters can be obtained by regulating the proportions of reactants and the reaction conditions.

The compounds of Formula I wherein R is a lower-alkyl radical are prepared by conventional etherification reactions, for example, by reacting the diol or a 17-acylate thereof with a lower-alkyl ester of a strong acid such as dimethyl sulfate or methyl iodide in the presence of a strong base. The free hydroxy group at position 17 is not etherified under these conditions.

The compounds of the invention are useful as intermediates for compounds having an aromatic ring A characteristic of the estrogens. The transformation is effected by the "dienone-phenol" rearrangement reaction first discovered by Inhoffen and coworkers. This involves migration of the angular methyl group at $C_{10}$ to either the 2- or the 4-position, followed by aromatization of the A-ring (cf. Fieser and Fieser, Natural Products Related to Phenanthrene, Reinhold Publishing Corp. 1949, page 33–6). The compounds of the invention have also been found to possess anabolic activity while lacking androgenic activity.

The following examples will further illustrate the invention without the latter being limited thereby.

EXAMPLE 1

1,4-androstadiene-2,17β-diol-3-one (I; R and R' are H).—To a partial solution of 6.0 g. (0.0155 mole) of pulverized 2β,17β-diacetoxy-4-androsten-3-one, M.P. 199–201° C., in 250 ml. of 95% ethanol was added a solution of 4.0 g. of potassium hydroxide (85% purity) in 150 ml. of water. The mixture was stirred vigorously at room temperature while a stream of oxygen gas was bubbled through it. Within thirty minutes all of the solid had dissolved. The stirring was stopped but the gas addition was continued for a total of seven hours. Acetic acid (5 ml.) was then added and the colorless solution was concentrated to a 225 ml. volume by warming in vacuo. The precipitated solid was collected by filtration from the cooled mixture, air dried, and recrystallized from ethyl acetate to give 3.3 g. of 1,4-androstadiene-2,17β-diol-3-one in the form of colorless rods and prisms, M.P. 207–209° C., $[\alpha]_D^{25} = -16.2°$ (1% in choloroform); ultraviolet maximum at 254 mμ.

Analysis.—Calcd. for $C_{19}H_{26}O_3$: C, 75.46; H, 8.67. Found: C, 75.72; H, 8.90.

The same product can be obtained by replacing the 2β,17β-diacetoxy-4-androsten-3-one in the above example by a molar equivalent amount of 4-androstene-2β,17β-diol-3-one.

EXAMPLE 2

2,17β-diacetoxy-1,4-androstadien-3-one (I; R and R' are $CH_3CO$).—A mixture of 2.33 g. of 1,4-androstadiene-2,17β-diol-3-one (Example 1), M.P. 200–208° C., 8 ml. of pyridine and 4 ml. of acetic anhydride was heated at 100° C. for two hours. The cooled solution was poured into 300 ml. of water and the precipitated solid (2.98 g.) collected by filtration. The solid product was dissolved in an ether-methylene dichloride-pentane (1:1:8) mixture and chromatographed on 300 g. of silica gel. Gradual change of the solvent mixture to a 4:1:5 ratio eluted the desired diacetate which, after a single recrystallization from methanol, amounted to 2.25 g. of 2,17β-diacetoxy-1,4-androstadien-3-one, M.P. 208.5–209.5° C., $[\alpha]_D^{25} = +12.6°$ (1% in chloroform); ultraviolet maximum at 248 mμ (E=16,600).

Analysis.—Calcd. for $C_{23}H_{32}O_5$: C, 71.10; H, 8.30; O, 20.59. Found: C, 71.30; H, 8.22; O, 20.60.

By replacement of the acetic anhydride in the preceding preparation by a molar equivalent amount of propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, or cinnamoyl chloride, there can be obtained, respectively, 2,17β-dipropionoxy-1,4-androstadien-3-one, 2,17β-dicaproyloxy-1,4-androstadien-3-one, 2,17β-bis(β-carboxypropionoxy)-1,4-androstadien-3-one, 2,17β-bis(β- cyclopentylpropionoxy) - 1,4 - androstadien-3-one, 2,17β-dibenzoyloxy-1,4-androstadien-3-one, 2,17β-bis(p - nitrobenzoyloxy) - 1,4-androstadien-3-one, 2,17β-bis(3,4,5-trimethoxybenzoyloxy) - 1,4 - androstadien - 3 - one, 2,17β-bis(phenylacetoxy)-1,4 - androstadien - 3 - one, or 2,17β-dicinnamoyloxy-1,4-androstadien-3-one.

EXAMPLE 3

*2-methoxy-1,4-androstadien-17β-ol-3-one* (I; R is CH₃, R' is H).—To a solution of 3.04 g. (0.01 mole) of 1,4-androstadiene-2,17β-diol-3-one (Example 1), M.P. 202–208° C., in 90 ml. of absolute ethanol and 10 ml. of 2 N sodium hydroxide solution was added a solution of 1.89 g. (0.015 mole) of dimethyl sulfate in 10 ml. of absolute ethanol. After the resulting solution had stood at room temperature for three hours, the solvent was removed by warming in vacuo, and the residue was stirred with water and ether. The layers were separated, the water layer was extracted with ether, and the combined ether layers concentrated to dryness. The residue was chromatographed on 100 g. of activated magnesium silicate starting with a solvent mixture of ether-pentane-methylene dichloride (2:2:1). Gradual change to a 4:1 ether-methylene dichloride mixture eluted the initial portions of the desired product. The remainder of the product was eluted with a 4:1 ether-acetone mixture. A single recrystallization of the total product from acetone gave 1.06 g. of 2-methoxy-1,4-androstadien-17β-ol-3-one in the form of colorless, massive prisms, M.P. 215–218.5° C.

By replacement of the dimethyl sulfate in the preceding preparation by a molar equivalent amount of diethyl sulfate, propyl iodide, isopropyl iodide, or dibutyl sulfate, there can be obtained, respectively, 2-ethoxy-1,4-androstadien-17β-ol-3-one, 2-propoxy-1,4-androstadien-17β - ol-3-one, 2-isopropoxy-1,4-androstadien-17β-ol-3-one, or 2-butoxy-1,4-androstadien-17β-ol-3-one.

2-methoxy-1,4-androstadien-17β-ol-3-one can be caused to react with acetic anhydride in pyridine according to the manipulative procedure described above in Example 2 to give 2-methoxy-17β-acetoxy-1,4-androstadien-3-one.

I claim:

1. The process for preparing 1,4-androstadiene-2,17β-diol-3-one which comprises treating with oxygen under aqueous alkaline conditions a compound selected from the group consisting of 4-androstene-2β,17β-diol-3-one and carboxylic acid esters thereof.

2. The process for preparing 1,4-androstadiene-2,17β-diol-3-one which comprises treating with oxygen under aqueous alkaline conditions 2β,17β-diacetoxy-4-androsten-3-one.

3. The process for preparing an ester of 1,4-androstadiene-2,17β-diol-3-one which comprises treating with oxygen under aqueous alkaline conditions a compound selected from the group consisting of 4-androstene-2β,17β-diol-3-one and carboxylic acid esters thereof, and reacting the resulting 1,4-androstadiene-2,17β-diol - 3 - one with a member of the group consisting of carboxylic acid anhydrides and carboxylic acid halides in the presence of an organic base.

4. The process for preparing 2,17β-diacetoxy-1,4-androstadien-3-one which comprises treating with oxygen under aqueous alkaline conditions 2β,17β-diacetoxy-4-androsten-3-one, and reacting the resulting 1,4-androstadiene-2,17β-diol-3-one with acetic anhydride in the presence of an organic base.

5. The process for preparing a 2-lower-alkyl ether of 1,4-androstadiene-2,17β-diol-3-one which comprises treating with oxygen under aqueous alkaline conditions a compound selected from the group consisting of 4-androstene-2β,17β-diol-3-one and carboxylic acid esters thereof, and reacting the resulting 1,4-androstadiene-2,17β-diol-3-one with a lower-alkyl ester of a strong acid in the presence of a strong base.

6. The process for preparing 2-methoxy - 1,4 - androstadien-17β-ol-3-one which comprises treating with oxygen under aqueous alkaline conditions 2β,17β-diacetoxy-4-androsten-3-one, and reacting the resulting 1,4-androstadiene-2,17β-diol-3-one with dimethyl sulfate in the presence of a strong base.

References Cited in the file of this patent

UNITED STATES PATENTS 2,948,740    Baran _____ Aug. 9, 1960

OTHER REFERENCES

Baran: J. Am. Chem. Soc., vol. 80, pages 1687–91 (1958).